(12) United States Patent
Gilbertson et al.

(10) Patent No.: US 11,719,928 B2
(45) Date of Patent: Aug. 8, 2023

(54) CLEANING FOR ROTATING SENSORS

(71) Applicant: Waymo LLC, Mountain View, CA (US)

(72) Inventors: Seth Gilbertson, Dublin, CA (US); Min Wang, Los Altos Hills, CA (US); Mincheol Shin, Los Altos Hills, CA (US); Oliver Simon Matthews, Los Altos Hills, CA (US); Steffen Walter, Los Altos Hills, CA (US)

(73) Assignee: Waymo LLC, Mountain View, CA (US)

( * ) Notice: Subject to any disclaimer, the term of this patent is extended or adjusted under 35 U.S.C. 154(b) by 278 days.

(21) Appl. No.: 17/034,597

(22) Filed: Sep. 28, 2020

(65) Prior Publication Data
US 2022/0099964 A1 Mar. 31, 2022

(51) Int. Cl.
*G02B 27/00* (2006.01)
*B60S 1/54* (2006.01)
*B08B 7/02* (2006.01)
*B60S 1/46* (2006.01)
*B60S 1/56* (2006.01)

(52) U.S. Cl.
CPC .......... *G02B 27/0006* (2013.01); *B08B 7/028* (2013.01); *B60S 1/46* (2013.01); *B60S 1/54* (2013.01); *B60S 1/56* (2013.01)

(58) Field of Classification Search
CPC ....... G02B 27/0006; B08B 7/028; B08B 3/02; B08B 5/02; B60S 1/46; B60S 1/54; B60S 1/56; B60S 1/481; G01S 7/497; G01S 7/027; G01S 13/931; G01S 2007/4977; G01S 2013/93273; H01L 21/67028; H01L 21/027; H01L 21/6715; H01L 21/68764; H01L 21/0273; H01L 21/67051; H01L 21/0271; H01L 21/67034; H01L 21/6704; H01L 21/02057; H01L 21/0274; G03F 7/3021; G03F 7/3057
See application file for complete search history.

(56) References Cited

U.S. PATENT DOCUMENTS

| | | | |
|---|---|---|---|
| 9,316,436 B2 | 4/2016 | Trevett et al. | |
| 10,150,143 B2 | 12/2018 | Trevett et al. | |
| 10,207,300 B2 | 2/2019 | Trevett et al. | |
| 2018/0009418 A1* | 1/2018 | Newman | B08B 3/02 |

(Continued)

FOREIGN PATENT DOCUMENTS

| | | |
|---|---|---|
| KR | 20190026680 A | 3/2019 |
| WO | 2015011126 A1 | 1/2015 |

(Continued)

OTHER PUBLICATIONS

International Search Report and Written Opinion for Application No. PCT/US21/51971 dated Jan. 11, 2022.

*Primary Examiner* — Alexander Markoff
(74) *Attorney, Agent, or Firm* — Botos Churchill IP Law

(57) ABSTRACT

Aspects of the disclosure relate to cleaning rotating sensors having a sensor housing with a sensor input surface. For instance, a first signal indicating that there is a contaminant on the sensor input surface may be received. In response to receiving the first signal, a second signal may be sent in order to cause one or more transducers to generate waves in order to attempt to remove the contaminant from the sensor input surface.

17 Claims, 13 Drawing Sheets

(56) References Cited

U.S. PATENT DOCUMENTS

| | | | |
|---|---|---|---|
| 2018/0086316 A1 | 3/2018 | Trebouet et al. | |
| 2018/0143298 A1* | 5/2018 | Newman | G01C 21/3484 |
| 2018/0329206 A1* | 11/2018 | Cohen | B08B 7/028 |
| 2018/0370474 A1 | 12/2018 | Krishnan et al. | |
| 2019/0255577 A1* | 8/2019 | Trevett | B23Q 11/08 |
| 2020/0377058 A1* | 12/2020 | Ward | B60Q 1/02 |
| 2021/0253067 A1* | 8/2021 | Poton | B60S 1/528 |

FOREIGN PATENT DOCUMENTS

| | | |
|---|---|---|
| WO | 2019101388 A1 | 5/2019 |
| WO | 2019141665 A1 | 7/2019 |
| WO | 2020053298 A1 | 3/2020 |

* cited by examiner

CLEANING FOR ROTATING SENSORS

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, etc., which can cause a buildup of contaminants such as foreign object debris, including as water, dirt, etc., on these sensors. Typically, the sensors include a housing to protect the internal sensor components of the sensors from the contaminants, but over time, the housing itself may become dirty. As such, the functions of the sensor components may be impeded as signals transmitted and received by the internal sensor components are blocked by the contaminants.

BRIEF SUMMARY

One aspect of the disclosure provides a method for cleaning a sensor, the sensor including a rotating sensor housing with a sensor input surface. The method includes receiving, by one or more processors, a first signal indicating that there is a contaminant on the sensor input surface, and in response to receiving the first signal, sending, by the one or more processors, a second signal in order to cause one or more transducers to generate waves in order to attempt to remove the contaminant from the sensor input surface.

In one example, the first signal further indicates a location of the contaminant on the sensor input surface. In another example, the method also includes in response to receiving the second signal, sending a third signal to cause a liquid nozzle to provide a spray of liquid cleaning fluid on the sensor input surface. In this example, sending the third signal further causes an air nozzle to provide a puff of gas on the sensor input surface. In another example, the second signal further causes a liquid nozzle to provide a spray of liquid cleaning fluid on the sensor input surface. In this example, the method also includes sending a third signal to cause an air nozzle to provide a puff of gas on the sensor input surface. In another example, the first signal further indicates a type of the contaminant and wherein sending the second signal is further based on the type of contaminant. In this example, the method also includes, controlling a ratio of standing waves to traveling waves generated by the one or more transducers based on the type of contaminant. In addition, the method also includes initially, maximizing the ratio of standing waves to traveling waves to perform a cleaning function and thereafter minimizing the ratio of standing waves to traveling waves to perform a clearing function. In addition or alternatively, when the type of contaminant is water, the method further comprises, minimizing the ratio of standing waves to traveling waves to perform a clearing function. Alternatively, when the type of contaminant is other than water, the method further comprises, maximizing the ratio of standing waves to traveling waves to perform a cleaning function. In another example, the method also includes, generating the first signal based on impedance information from the one or more transducers.

Another aspect of the disclosure provides a system for cleaning a sensor. The sensor including a rotating sensor housing with a sensor input surface. The system includes one or more transducers and one or more processors. The one or more processors are configured to receive, by one or more processors, a first signal indicating that there is a contaminant on the sensor input surface, and in response to receiving the first signal, sending a second signal to cause the one or more transducers to generate waves in order to attempt to remove the contaminant from the sensor input surface.

In one example, the first signal further indicates a location of the contaminant on the sensor input surface. In another example, the one or more transducers include exactly three transducers. In another example, the one or more transducers include at least one pair of transducers. In this example, the at least one pair of transducers includes at least one higher frequency transducer and at least one lower frequency transducer. In another example, the one or more transducers include a convex shape. In another example, the one or more transducers include a concave shape. In another example, the first signal further indicates a type of the contaminant and wherein sending the second signal is further based on the type of contaminant, and the method further comprises, controlling a ratio of standing waves to traveling waves generated by the one or more transducers based on the type of contaminant.

DETAILED DESCRIPTION

Overview

Figure 1:
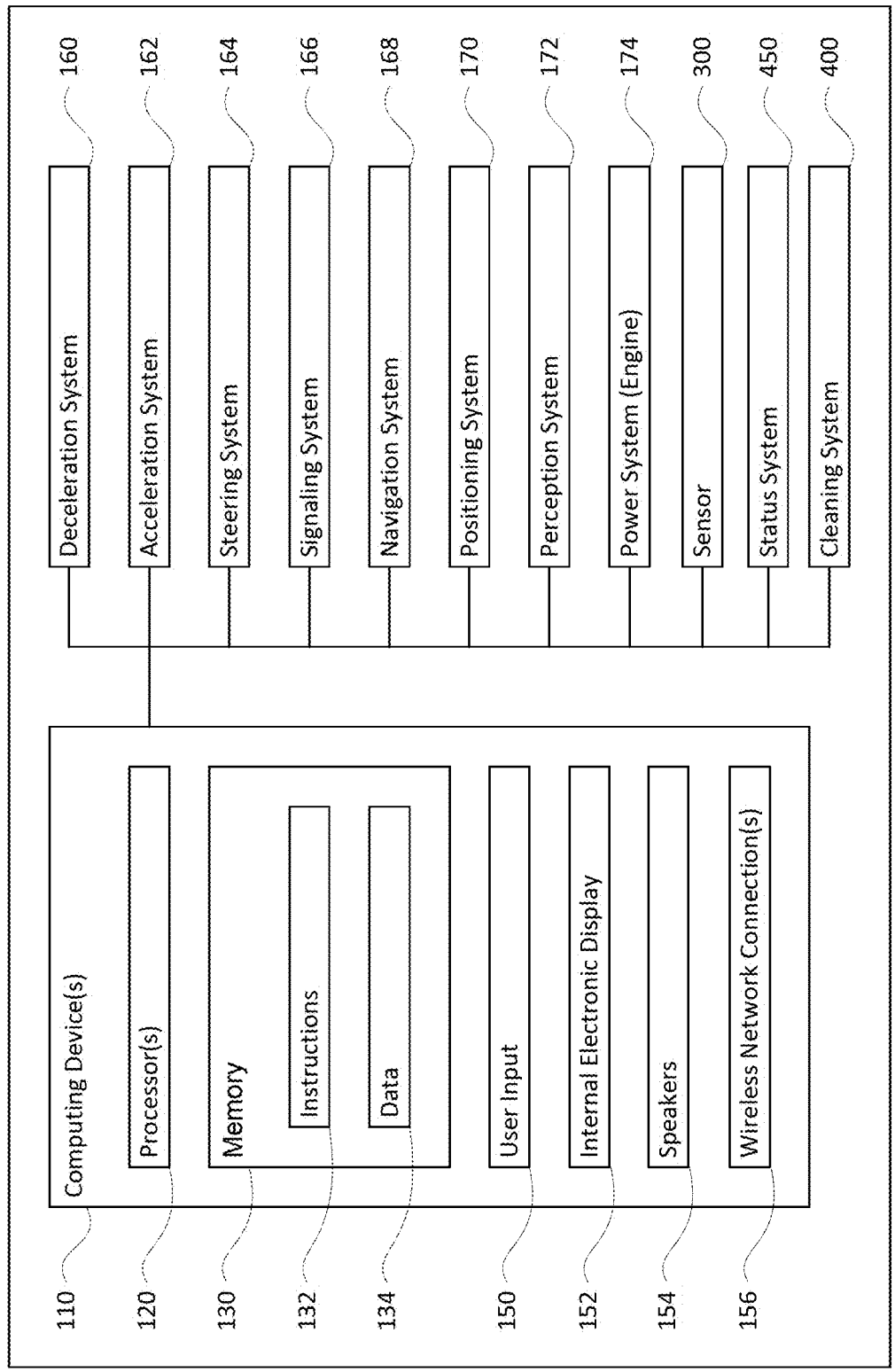
FIG. 1 is a functional diagram of an example vehicle in accordance with aspects of the disclosure.

The technology relates to an ultrasonic cleaning system for a rotating sensor mounted on a vehicle, such as an autonomous vehicle. The sensor may be a LIDAR, camera, radar, sonar or other sensor which includes a sensor housing which rotates relative to the vehicle. The sensor housing may house the internal components of the sensor and may include a sensor input surface through which signals may be sent and received. If the sensor input surface becomes partially or completely occluded by contaminants such as foreign object debris, including water, dirt, etc., the sensor's ability to detect and identify objects in the vehicle's environment may become degraded. Because detecting and identifying objects is a critical function for an autonomous vehicle, clearing such foreign object debris can also become critically important.

A sensor may be arranged or mounted at various locations on the vehicle. The sensor may include a housing 310 to protect internal sensor components 360 from by contaminants such as foreign object debris, including water, dirt, insects, and other contaminants. However, over time, the housing and other sensor components may collect contaminants. As such, the functions of internal sensor components may be impeded as signals transmitted and received by the internal sensor components may be blocked by the contaminants. To address this, contaminants may be cleared from the sensor by rotating the internal sensor components within the housing. In some instances, this rotation may enable one or more wipers to clear any contaminants on a sensor input surface of the sensor.

To provide cleaning and clearing functionality for the sensor, an ultrasonic cleaning system may be used. For instance, cleaning may refer to detaching contaminants from the sensor input surface which are chemically attached by causing cavitation through liquid over the sensor input surface. When an organic contaminant hits the sensor input surface, compounds may chemically bond to the surface making such compounds difficult to remove. With the ultrasonic cleaning system, liquid cleaning fluid may be added to the sensor input surface and ultrasonic waves may move the glass. This may occur with such speed that fluids, such as liquid cleaning fluid, may cavitate, resulting in a "cold boil" or a boiling caused by low pressure as opposed to high heat. This boiling action may actually result in a cleaning function or effect as vapor bubbles created by the cold boil collapse with great force "chipping" the contaminates from the sensor input surface. This action can be maximized by actively creating standing waves over the sensor input surface. The clearing function may refer to propelling droplets of precipitation which are not chemically bonded to the sensor input surface. This action can be maximized by actively creating traveling waves or increasing the number of traveling waves generated as compared to standing waves. Thus, by controlling a ratio of standing to traveling waves, the ultrasonic cleaning system can provide both cleaning and clearing functions, and thereby achieving a clear or nearly clear sensor input surface with little to no contaminants.

The ultrasonic cleaning system may include a liquid nozzle, an air nozzle 420, one or more controllers, and one or more transducers. The liquid nozzle may be connected to a reservoir storing liquid cleaning fluid. A liquid pump may be configured to pump liquid cleaning fluid from the reservoir through a liquid valve, tubing, and out of the liquid nozzle in order to clean the sensor input surface. The liquid nozzle may be arranged at different locations around the sensor.

In all arrangements of the liquid nozzle, the rotation of the sensor housing may help to clear the liquid cleaning fluid from the sensor input surface. However, the rotation may not be enough to ensure that the liquid cleaning fluid is fully removed from the sensor input surface. As such, the air nozzle may generate a puff of fluid, such as air or another gas, in order to force the liquid cleaning fluid off of the sensor input surface. To do so, an air pump may be configured to pump air through an air valve, tubing, and out of the air nozzle in order to clean the sensor input surface.

The controllers may include one or more computing devices having one or more processors and memory. The controllers may be configured to receive, and act upon, various signals. For example, a controller may be configured to receive feedback from a position sensor indicating the position of the sensor. From this information as well as the rotation speed of the sensor housing, a controller may determine the current position, for example the current angular position, of the sensor input surface at any given point in time.

The controllers may also receive signals from the sensor and/or other computing devices of the vehicle indicating the current state of the sensor. In some aspects, a controller may use the current position of the sensor input surface to determine exactly when and how to activate the transducers in order to provide cleaning and/or clearing functions. In addition or alternatively, a controller may use the current position of the sensor input surface to determine exactly when to activate the liquid pump and the air pump as well as to open the air and liquid valves in order to both apply liquid cleaning fluid to the sensor input surface as well as to clear the cleaning fluid from the sensor input surface using a puff of gas.

The transducer may be arranged in any number of different configurations. Each configuration may be associated with different benefits and/or drawbacks and may be selected based upon where (e.g. geographically) a particular sensor is being used or for which function (cleaning or clearing) the ultrasonic cleaning system is to be optimized. For instance, pairs of transducers may be better able to generate standing wavers and thus may do a better job of creating a local pressure difference at different locations on the sensor input surface, thereby providing a better clearing function. In this regard, a single transducer (i.e. one of a plurality of transducers or only a single transducer), may be used to generate more traveling waves as compared to standing waves when attempting to provide a cleaning function. In addition, more than one transducer can be used for the cleaning and clearing functions using different activation timing.

The exact frequencies of the transducers used may be dependent upon the configuration and characteristics of the sensor input surface. For instance, the sensor input surface may be formed from glass. Some glass may work with many ranges of frequencies depending upon the acoustic properties of the glass including the longitudinal wave speed and shear wave speed. This combination of wave speeds will provide a different in and out of plane motion over the glass surface.

To affect the cleaning and/or clearing of the sensor input surface, a first signal may be received by one or more processors indicating that there is a contaminant on the sensor input surface. This first signal may be received from the sensor status system based on any number of different inputs including a degraded signal from the sensor, camera images of the sensor input surface, and/or feedback from the transistors. This feedback may also be used to determine a type of contamination on the sensor input surface.

In response to receiving the first signal, a second signal may be sent to cause a transducer to generate waves in order to attempt to remove the contaminant from the sensor input surface. In this regard, the ultrasonic cleaning system may activate the ultrasonic cleaning and/or clearing functions of the transducers. For instance, a controller may activate the transducers based on the type of contaminant to generate waves, for instance to increase or decrease the ratio of standing waves to traveling waves in order to promote clearing or cleaning. In some instances, in addition, the ultrasonic cleaning system may activate liquid nozzle and air nozzle (if used). In this regard, the liquid nozzle may provide a spray of liquid cleaning fluid to attempt to clean contaminants from the sensor input surface, and the air nozzle may provide a puff of gas to remove liquid cleaning fluid and/or contaminants from the sensor input surface.

In addition, once the liquid nozzle has generated the spray of liquid cleaning fluid, the controller may activate the transducers in order to generate traveling waves according to the clearing function (or decrease the ratio of standing waves to traveling waves). In this regard, individual transducers may be activated at different times in order to generate more traveling waves and thereby, in conjunction with the rotation of the sensor housing as well as the puff of gas generated by the air nozzle (if used), to cause the liquid solution, contaminants and other fluids to be removed from the sensor input surface. As a result, the sensor input surface may return to optimal (clean) or near optimal performance. This cleaning and clearing may be repeated as needed to reduce or keep the sensor input surface clear of contaminants.

The features described herein may provide for a useful and practical approach to cleaning rotating sensors. The combination of cleaning and clearing functionality of the ultrasonic cleaning features described herein may provide significant improvements over other systems without such features. Moreover, the use of ultrasonic cleaning may also reduce the amount of liquid cleaning solution needed to remove contaminants from a sensor input surface. In addition, the use of the impedance information to detect contaminants may obviate the need for additional devices, (e.g., a camera) to serve the same purpose and thereby save power and other resources on the vehicle. Other benefits may include potentially, better reliability of the ultrasonic cleaning system (due to fewer mechanical parts), lower cost (once having more integrated design and mass produced), smaller (as the transducers can be miniature), as well as a simplified construction with fewer maintenance requirements than other cleaning and clearing approaches with more hardware and more potential points of failure.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having a heading that is oriented at an angle that is 20 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing device 110 to provide information to passengers within the vehicle 100. The vehicle may also include one or more wireless network connections 156 to facilitate communications with devices remote from the vehicle and/or between various systems of the vehicle.

In one example, computing device 110 may be an autonomous driving computing system incorporated into vehicle 100. The autonomous driving computing system may be capable of communicating with various components and systems of the vehicle, for instance, wirelessly (via wireless network connections 156) and/or a wired connection (such as a controller area network bus or other communication bus). For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. The vehicle 100 may also include a ultrasonic cleaning system 400 and a sensor status system 460 discussed further below.

Again, although these systems are shown as external to computing device 110, in actuality, these systems may also be incorporated into computing device 110, again as an autonomous driving computing system for controlling vehicle 100. In addition or alternatively, each of these systems may include one or more computing devices having processors and memory, configured the same as or similarly to processors 120 and memory 130 of computing devices 110 in order to enable the functionalities of these systems as described here.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle 100. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

As an example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, speed, acceleration, rate of change of acceleration, deceleration, rate of change of deceleration, etc. The raw data from the sensors and/or the aforementioned characteristics can be quantified or arranged into a descriptive function, vector, and or bounding box and sent for further processing to the computing devices 110 periodically and continuously as it is generated by the perception system 172.

Figure 2:
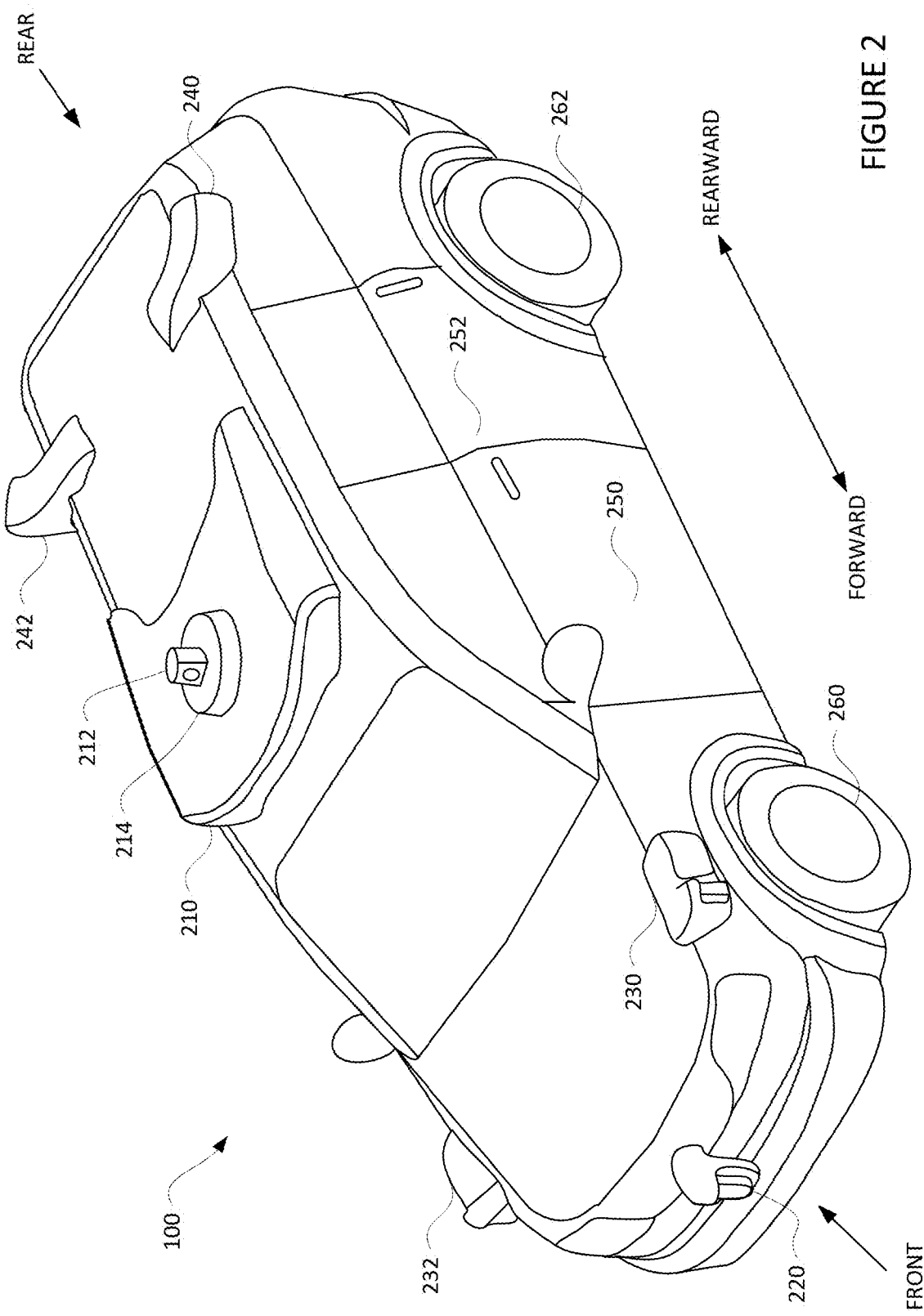
FIG. 2 is an example external view of a vehicle in accordance with aspects of the disclosure.

For instance, FIG. 2 is an example external view of vehicle 100. In this example, roof-top housing 210 and housings 212, 214 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras may be located at the front and rear ends of vehicle 100 and/or on other positions along the roof or roof-top housing 210. In addition, Vehicle 100 also includes many features of a typical passenger vehicle such as doors 250, 252, wheels 260, 262, etc.

Example Sensor

Figure 3:
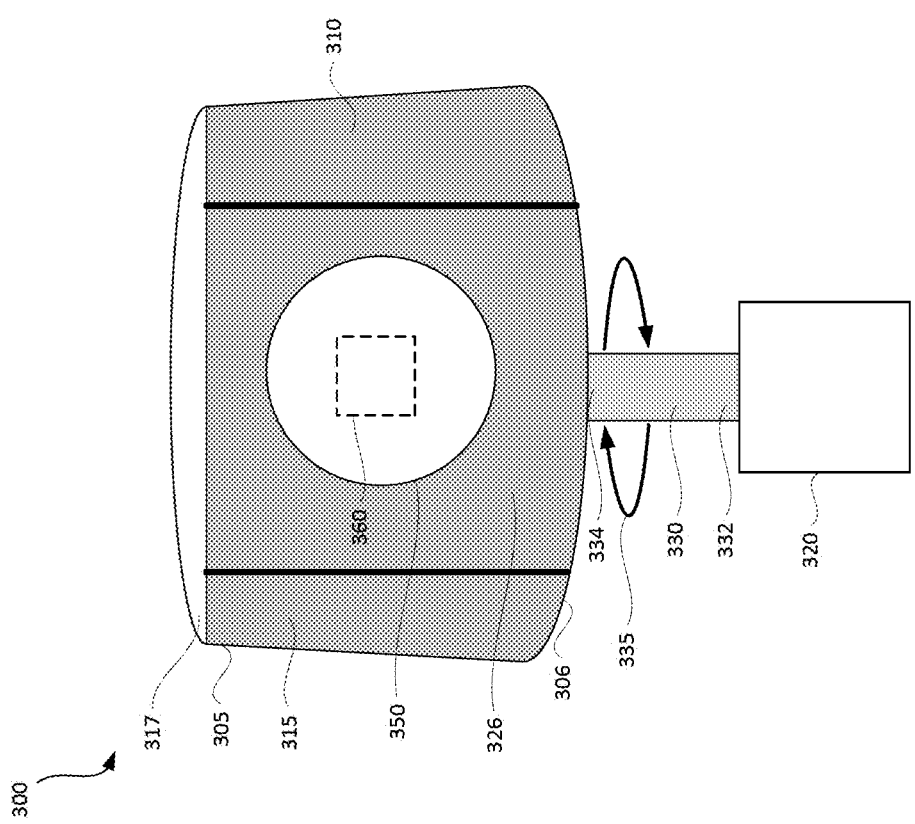
FIG. 3 is an example view of a sensor in accordance with aspects of the disclosure.

FIG. 3 depicts an example view of a sensor 300. The sensor may be arranged or mounted at various locations on the vehicle, including, for example, a top portion of the vehicle such as with housing 210 or at various other locations, such as the sides, front or rear of the vehicle. The sensor 300 may be incorporated into the aforementioned perception system and/or may be configured to receive commands from the computing devices 110, for instance via a wired or wireless connection.

The sensor 300 may include a housing 310 to protect the internal sensor components 360 (shown in dashed-line in FIG. 3 as they are internal to the housing 310) from contaminants such as foreign object debris, including water, dirt, insects, and other contaminants. However, over time, the housing and other sensor components may collect contaminants. As such, the functions of internal sensor components 360 may be impeded as signals transmitted and received by the internal sensor components may be blocked by the contaminants. To address this, contaminants may be cleared from the sensor 300 by rotating the internal sensor components 360 within the housing. This rotation may enable one or more wipers to clear any contaminants on a sensor input surface of the sensor.

The housing 310 may be configured in various shapes and sizes. As shown in the example of FIG. 3, the housing 310 may be configured such that it has a domed shaped top portion 317 with a side wall 305, such that the housing is in the shape of a frustum. Although the sensor housing is shown in the shape of a frustum, the sensor housing may be configured in various shapes and sizes, such as spheres, cylinders, cuboids, cones, prisms, pyramids, cubes, etc., or any combination of such shapes. The sensor housing 310 may be comprised of materials such as plastic, glass, polycarbonate, polystyrene, acrylic, polyester, etc. For instance, the housing may be a metal or plastic housing and the internal sensor components 360 have a "window" or sensor input surface 350 that allows the sensor to transmit and/or receive signals.

The sensor input surface may be arranged on or in the sensor housing such that the internal sensor components may transmit and receive one or more signals through the sensor input surface. For instance, the side wall 305 of the sensor housing 310 may include a flat portion 326 in which sensor input surface 350 is incorporated to allow signals (not shown) from internal sensor components 360 to penetrate the sensor cover 315, as further shown in FIG. 3. As an example, if the sensor housing is approximately 277 millimeters in diameter, the sensor input surface may be approximately 142 millimeters wide. Although the sensor input surface 350 is shown as being circular in FIG. 3, various other shapes may also be used for the sensor input surface. In addition, the sensor input surface may be incorporated onto non-flat surfaces of the housing.

In some instances the entire sensor housing 310, or a large portion of the sensor housing 310, may be penetrable by the signals transmitted and received by the internal sensor components, thereby allowing a large portion or the entire sensor housing 310 to function as a sensor input surface. Although the sensor input surface 350 is shown as being only a portion of the side wall 305, in some instances the entire side wall 305 may be constructed as a sensor input surface. Further, multiple sensor input surfaces may be positioned on the sensor housing 310. The sensor input surface 350 may be composed of the same, or different, material as the sensor housing 310.

The sensor 300 and/or sensor housing 310 may be attached to a motor via a sensor shaft. For instance, as further shown in FIG. 3, the sensor shaft 330 may include a first end 332 and a second end 334. The first end 332 of a sensor shaft 330 may be attached to a motor 320 and the second end of the sensor shaft 330 may be connected to the sensor 300 and/or sensor cover 315, such as at the base portion 306 of the sensor cover. In this regard, the first end of the sensor shaft 330 may be attached to the motor 320 via a belt, gear, chain, friction roller, etc. The motor 320 may rotate the sensor shaft 330 in the first direction 335 causing the entire sensor 300 and/or sensor housing 310 to also rotate in the first direction 335. In some embodiments the sensor shaft 330 may only rotate the sensor housing 310, and not the internal sensor components 360 of the sensor.

As another alternative, the internal sensor components and the housing may be configured to rotate independently of one another. In this regard, all or a portion of the housing 310 may be transparent (or transparent at least in the wavelengths of the signals to be received by the internal sensor components) in order to enable signals to pass through the housing and to reach the internal sensor components 360. In addition, to enable independent rotation, a first motor may be configured to rotate the housing 310 and a second motor may be configured to rotate the internal sensor components. In this example, the housing may be rotated to enable cleaning while the internal sensor components may still function to capture signals and generate sensor data.

The sensor 300, sensor housing 310, and/or motor 320 may each be located internally or externally from a vehicle. Although FIG. 3 shows the sensor 300 being attached to the motor 320 via a shaft 330, the motor 320 may be integrated or otherwise directly connected to the sensor 300 and/or sensor housing 310.

The internal sensor components 360 may transmit and receive one or more signals through the sensor input surface. In this regard, the internal sensor components may include one or more imaging sensors such as LIDAR, radar, sonar, camera, or other such imaging sensors positioned within the housing of the sensor. The sensor input surface may be a lens, mirror or other surface by which the signals can pass or are directed to other sensor components (e.g. a photodetector in the case of a camera) in order to generate sensor data.

Example Cleaning System

Figure 4:
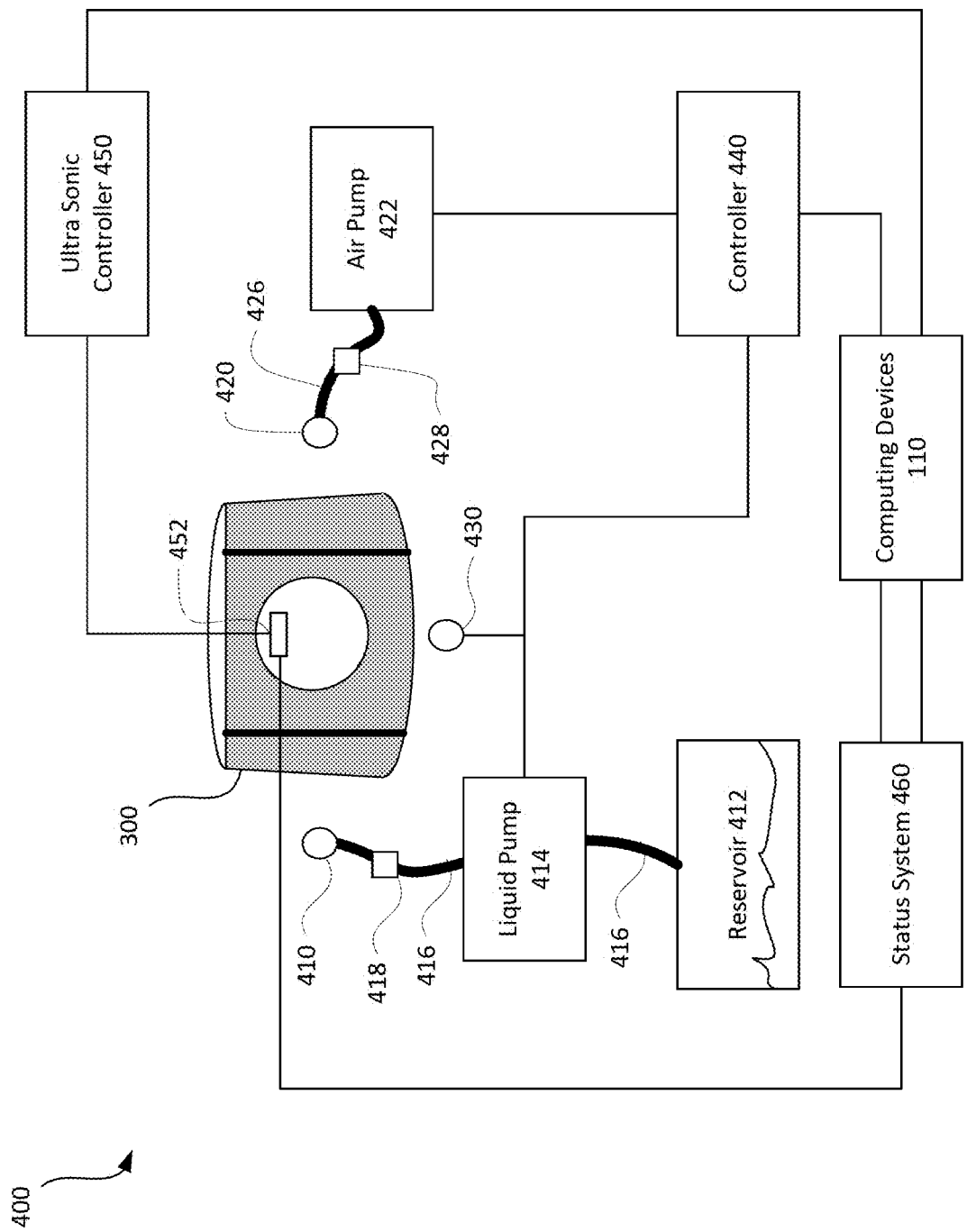
FIG. 4 is an example functional diagram of an ultrasonic cleaning system in accordance with aspects of the disclosure.

Turning to FIG. 4, an ultrasonic cleaning system 400 may be configured to provide both cleaning (e.g. removal of contaminants) and clearing (e.g. removal of liquid) functions. For instance, cleaning may refer to detaching contaminants from the sensor input surface which are chemically attached by causing cavitation through liquid over the sensor input surface. When an organic contaminant hits the sensor input surface, compounds may chemically bond to the surface making such compounds difficult to remove. With the ultrasonic cleaning system 400, liquid cleaning fluid may be added to the sensor input surface and ultrasonic waves may move the glass. This may occur with such speed that fluids, such as liquid cleaning fluid, may cavitate, resulting in a "cold boil" or a boiling caused by low pressure as opposed to high heat. This boiling action may actually result in a cleaning function or effect as vapor bubbles created by the cold boil collapse with great force "chipping" the contaminates from the sensor input surface. This action can be maximized by actively creating standing waves over the sensor input surface. The clearing function may refer to propelling droplets of precipitation which are not chemically bonded to the sensor input surface. This action can be maximized by actively creating traveling waves or increasing the number of traveling waves generated as compared to standing waves. Thus, by controlling a ratio of standing to traveling waves, the ultrasonic cleaning system can provide both cleaning and clearing functions, and thereby achieving a clear or nearly clear sensor input surface with little to no contaminants.

The ultrasonic cleaning system may include a liquid nozzle 410. In some instances, the ultrasonic cleaning system may also include an air nozzle 420. The liquid nozzle 410 may be connected to a reservoir 412 storing liquid cleaning fluid, including water, alcohol, or various other liquid cleaning fluids. Although depicted and described as a single nozzle, liquid nozzle 410 may actually represent two or more smaller nozzles directly adjacent to one another in order to provide a more directed stream of liquid cleaning fluid. A liquid pump 414 may be configured to pump liquid cleaning fluid from the reservoir through a liquid valve 418, tubing 416, and out of the liquid nozzle 410 in order to clean the sensor input surface. The tubing may be formed from any suitable materials such as plastic, silicone, metal, etc.

Figure 5:
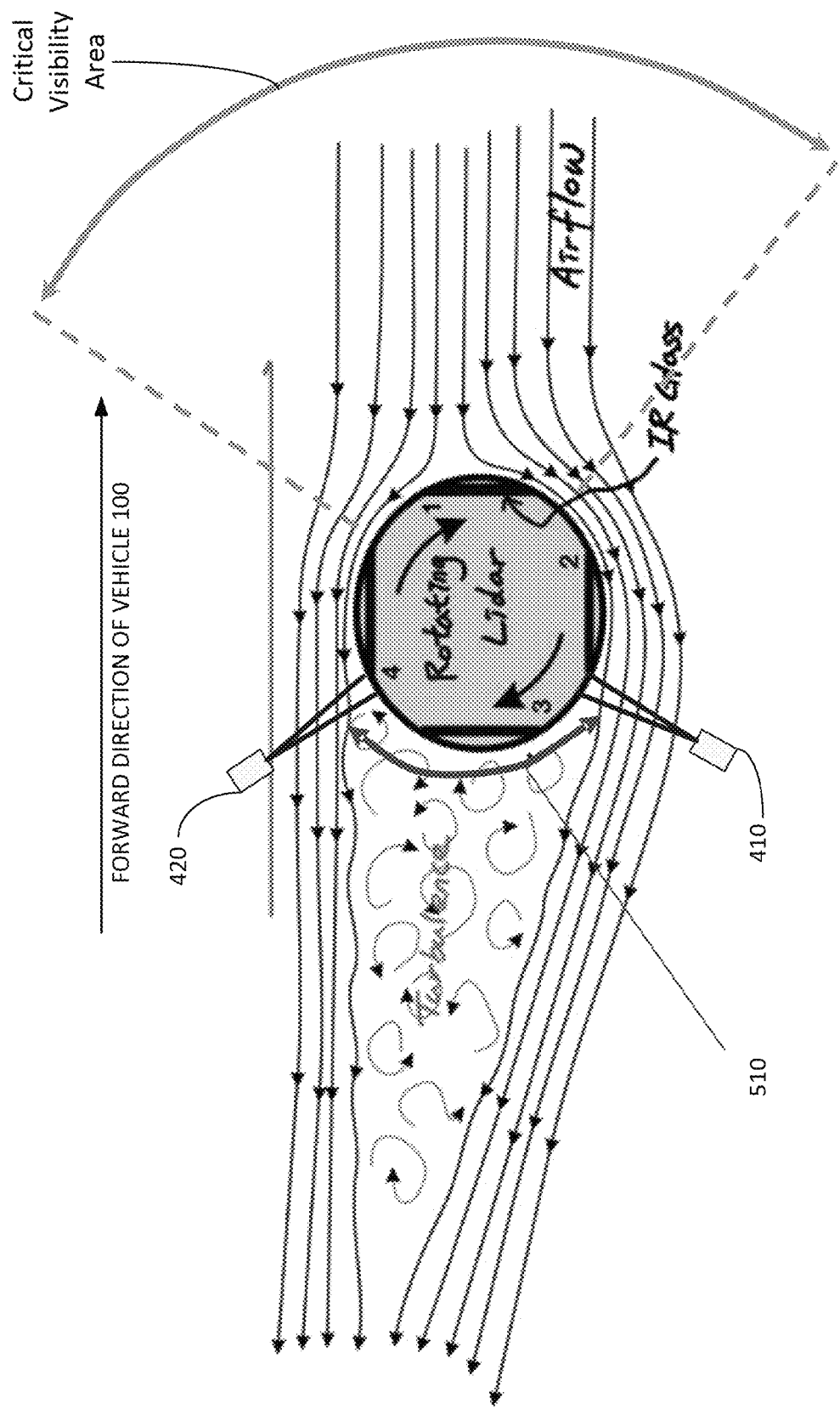
FIG. 5-7 are example top-down views of a sensor and direction of airflow and turbulence in accordance with aspects of the disclosure.
Figure 6:
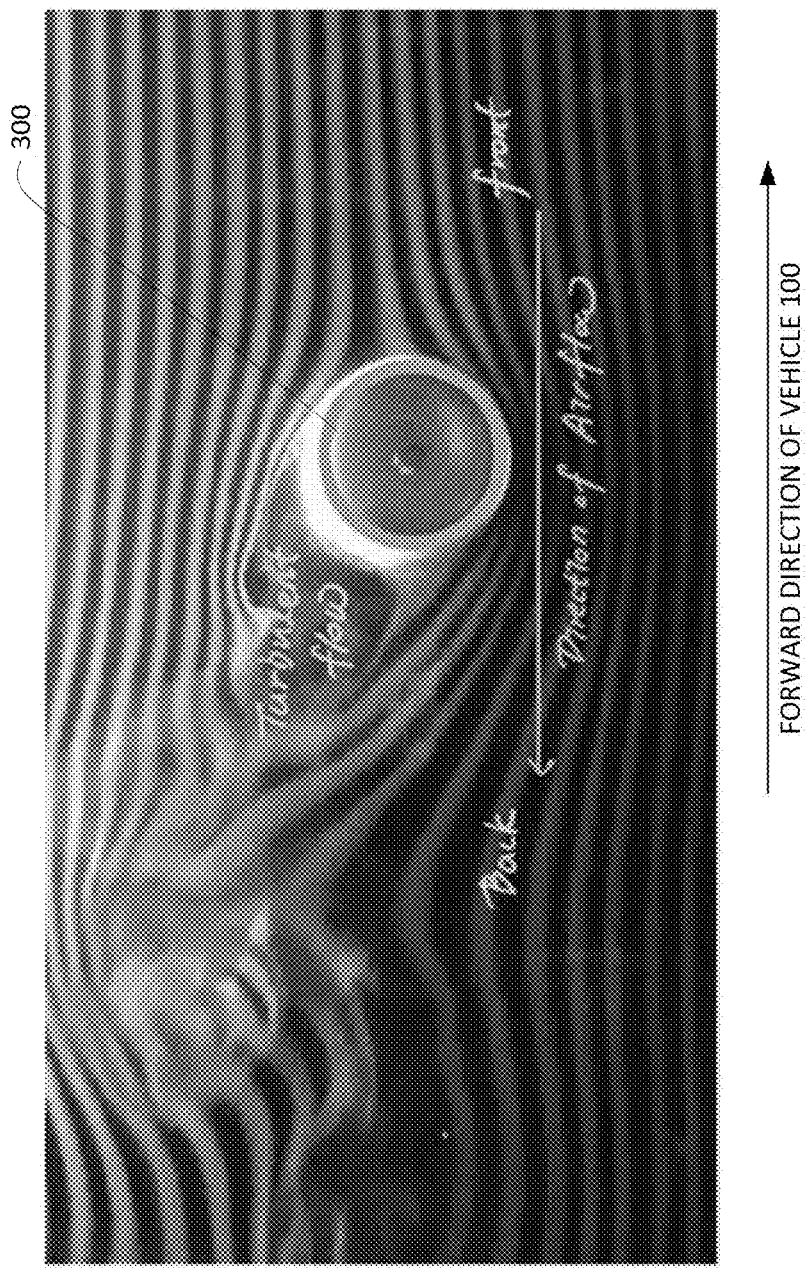
Figure 7:
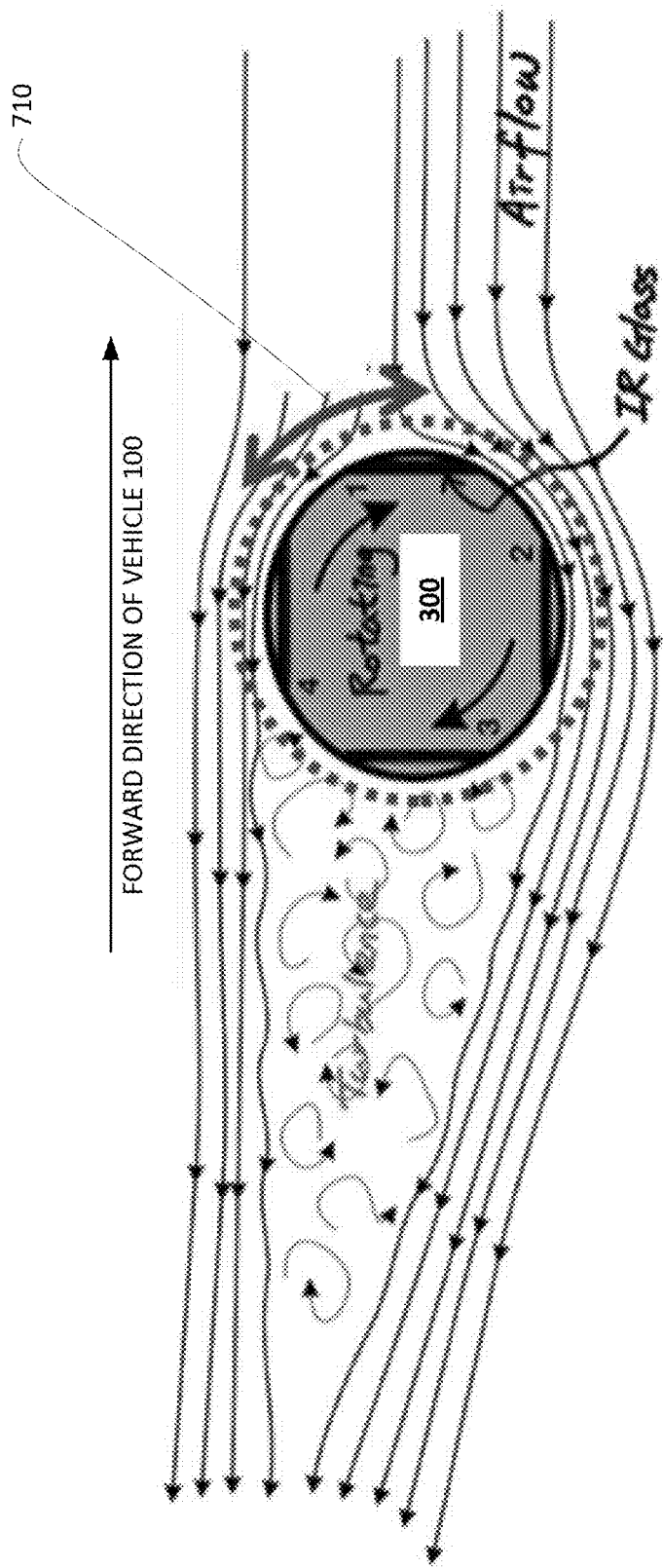

The liquid nozzle may be arranged at different locations around the sensor 300. FIGS. 5-7 represent top-down views of the sensor 300 and depict direction of airflow and turbulence cause when vehicle 100 is moving in the forward direction (depicted in FIG. 2) and the housing of the sensor is rotating in a clockwise direction. For instance, if optimizing for reducing the effects of the liquid cleaning fluid on the detection of objects in the forward-direction, the liquid nozzle 410 and air nozzle 420 may be arranged as depicted in FIG. 5 to maximize cleaning as the sensor input surface sweeps through the area depicted by arrow 510 during rotation. By positioning the liquid and air nozzles towards the rear of the vehicle (rather than the front), any liquid which is sprayed at the sensor housing and "misses" the sensor input surface 350 is located behind the vehicle, and therefore much less likely to be blown onto another sensor housing or some other portion of the vehicle. Moreover, this reduces the impact of the cleaning on the sensor data captured for the front of the vehicle where detecting objects may be most critical (e.g. emergency and other vehicles and other road users with which the vehicle could potentially collide are more likely to be located in front of the vehicle than behind). As another instance, if optimizing to reduce the effects of moving air and thereby reduce the power requirements for the liquid nozzle 410, for instance caused (or necessitated) by the forward motion of the vehicle as represented by the depiction in FIG. 6, on the spray of liquid cleaning fluid, the liquid nozzle 410 may be location in area 710 of FIG. 7.

In all arrangements of the liquid nozzle, the rotation of the sensor housing may help to clear the liquid cleaning fluid from the sensor input surface. However, the rotation may not be enough to ensure that the liquid cleaning fluid is removed as quickly as possible from the sensor input surface. As such, the air nozzle 420 may generate a puff of fluid, such as air or another gas, in order to force the liquid cleaning fluid off of the sensor input surface. In addition, the timing of a puff of gas from the air nozzle 420 may be determined by the controller 440 based on the type of contamination (if known). For instance, if the type of contaminant requires the liquid cleaning fluid to soak for some period of time and ultrasonic cleaning system 400 (really, the transducers 452) to run longer, a puff of gas may be delayed by some number of rotations of the sensor housing. In addition, if the contaminant on the sensor is merely fine water droplets (e.g. mist), only a puff of gas may be needed (and used) to clear the sensor input surface.

An air pump 422 may be configured to pump air through an air valve 428 and tubing 426, and out of the air nozzle in order to clean the sensor input surface. The tubing may be formed from any suitable materials such as plastic, silicone, metal, etc. While the exact locations may not be critical to cleaning, as noted below, the nozzles should be located at least half the maximum width of the spray from the nozzles or more or less apart. Using the example of a sensor housing that is approximately 277 millimeters in diameter and a sensor window that is approximately 142 millimeters wide, the angular distance between the nozzles relative to the sensor housing may be at least 80 degrees or more or less as shown in FIG. 5.

Figure 8:
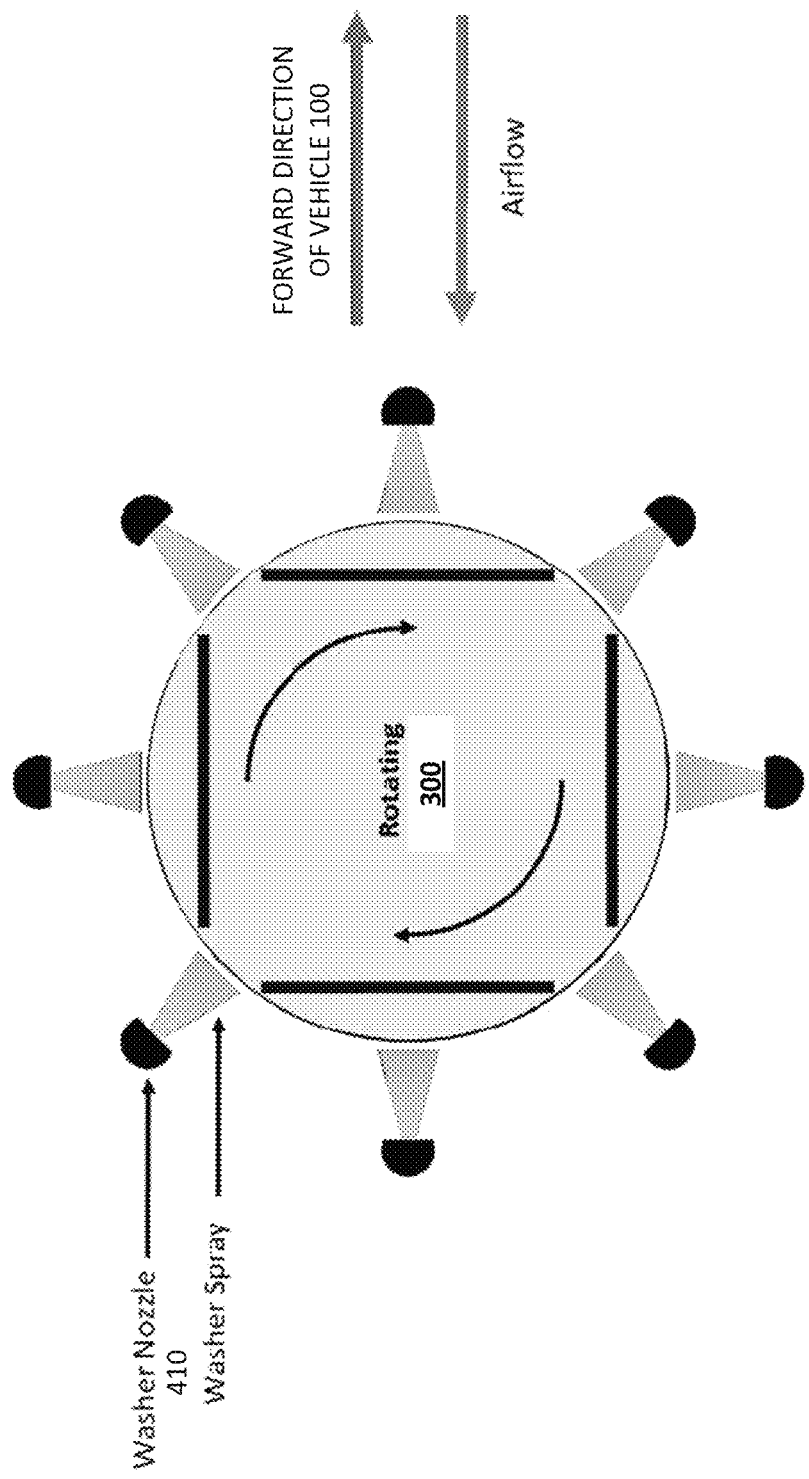
FIG. 8 is an example of configurations for a liquid nozzle in accordance with aspects of the disclosure.
Figure 9:
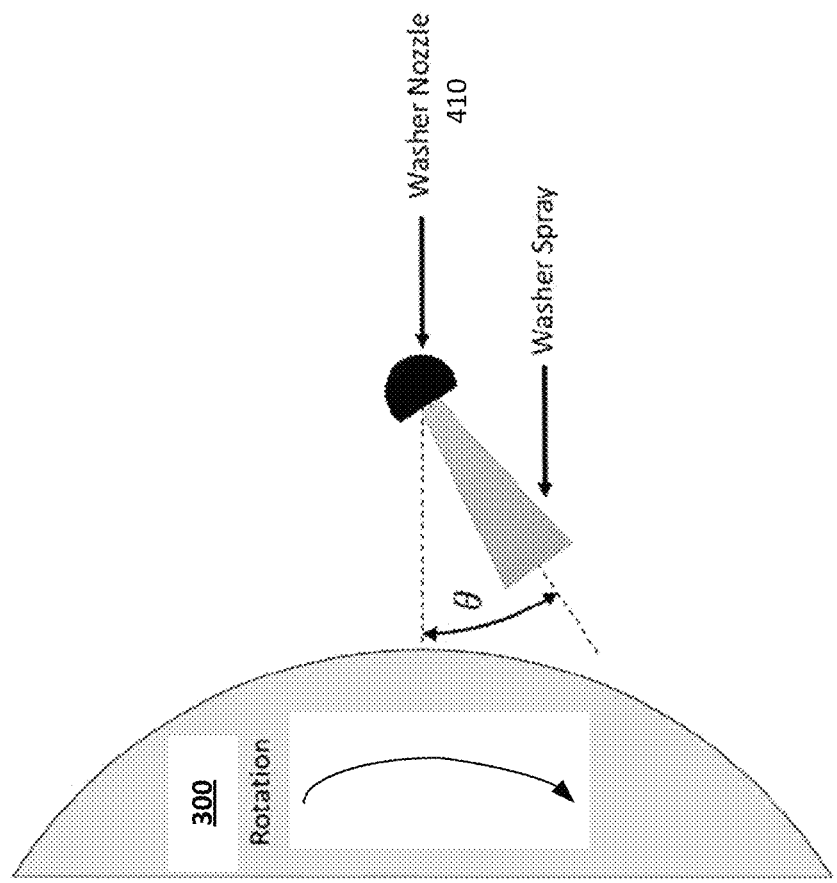
FIG. 9 is an example of a configuration for a liquid nozzle in accordance with aspects of the disclosure.

In addition, the liquid and air nozzles may be arranged at different angles relative to the sensor housing. For instance, as shown in FIG. 8, the liquid nozzle 410 may be arranged at 90 degrees relative to the sensor housing. Although multiple liquid nozzles are depicted in FIG. 8, this merely demonstrates that one or more liquid nozzles can be located at any point around the sensor 300. Alternatively, as shown in FIG. 9, the liquid nozzle may be offset from the sensor housing at an angle $\Theta$ (in the direction of rotation). This angle may range between 60 and 90 degrees or more or less and may increase the effectiveness of a spray of liquid cleaning fluid. Similar configurations may be used for the air nozzle 420 in order to increase the effectiveness of a puff of gas.

A position sensor 430 may be arranged to detect the current angular position of the sensor and/or sensor housing relative to the vehicle. The position sensor may include any rotational position sensor, such as a Hall effect array or an encoder, that can be used to track the position of the motor 320, housing 310, and/or the internal sensor components 360. In this regard, one or more processors, such as the one or more processors 120 or other similarly configured processors, may control the motor 320 based on feedback from the position sensor or another position sensor. In this regard, the position sensor may be configured to generate a signal indicating or identifying a location of one or more of the motor, housing, or the internal sensor components. The position sensor may be located at forward direction or position with respect to the vehicle (e.g. approximately 0 degrees), such that the position sensor detects each time a center of the sensor input surface rotates passes the position sensor.

Controllers 440, 450 may include one or more computing devices having one or more processors and memory, configured the same or similarly to the computing devices 110, processors 120, and memory 130. The controllers may be configured to receive, and act upon, various signals. For example, the controllers 440, 450 may be configured to receive feedback from the position sensor indicating the position of the sensor. From this information as well as the rotation speed of the sensor housing (for example, 10 Hz or more or less), the controllers may determine the current position, for example the current angular position, of the sensor input surface 350 at any given point in time.

The controllers 440, 450 may also receive signals from the sensor 300 and/or other computing devices of the vehicle indicating the current state of the sensor. For example, the controllers 440, 450 may receive signals indicating that the sensor input surface 350 is occluded or dirty. This information may be generated by another system, for example a sensor status system 460, configured to determine whether the sensor input surface 350 is dirty. As discussed further below, the sensor status system 460 may receive signals from the transducers 452 and use this information to determine whether there are any contaminants on the sensor input surface as discussed further below. In addition or alternatively, this system may capture images of the sensor input surface 350 and processes these images to determine whether there is any contaminants such as foreign object debris located on the sensor input surface 350 and if so, approximately where.

In response, the controller 440 may use the current position of the sensor input surface 350 to determine exactly when to activate the liquid pump 414 and the air pump 422 as well as to open the air and liquid valves in order to both apply liquid cleaning fluid to the sensor input surface as well as to clear the cleaning fluid from the sensor input surface 350 using a puff of gas. For example, by knowing the location of any given point on the sensor, the controller 440 may determine the relative position of the forward facing and rearward facing edges (relative to the direction of rotation) of the sensor input surface. In this regard, the controller is able to determine the exact location of the edges of the sensor input surface. Although controllers 440, 450 are depicted and described herein as distinct controllers, a single controller could be used to drive both the nozzles and the transducers.

Figure 10:
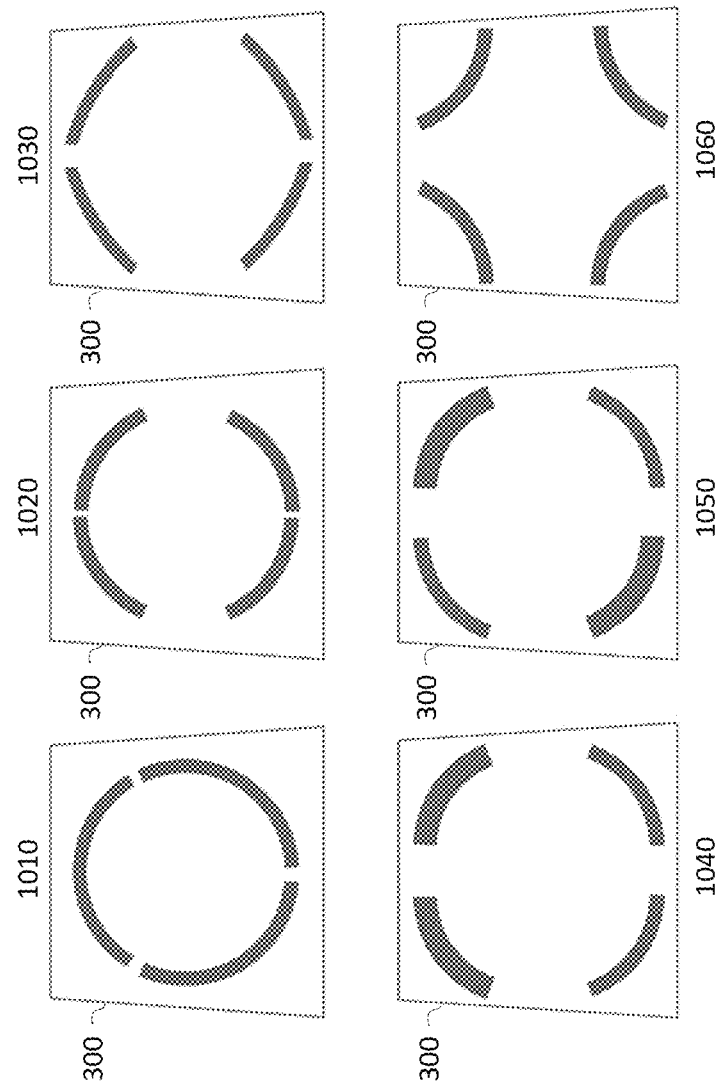
FIG. 10 are examples of different configurations for transducers in accordance with aspects of the disclosure.

FIG. 10 represents side perspective views of the sensor 300 with different possible configurations for the transducers 452 arranged on the sensor input surface 350. Each configuration may be associated with different benefits and/or drawbacks and may be selected based upon where (e.g. geographically) a particular sensor is being used or for which function (cleaning or clearing) the ultrasonic cleaning system 400 is to be optimized. For instance, pairs of transducers may be better able to generate traveling waves and thus may do a better job of creating a local pressure difference at different locations on the sensor input surface, thereby providing a better clearing function. In this regard, a single transducer (i.e. one of a plurality of transducers or only a single transducer), may be used to generate more standing waves as compared to traveling waves when attempting to provide a cleaning function. In addition, more than one transducer can be used for the cleaning and clearing functions using different activation timing.

The exact frequencies of the transducers used may be dependent upon the configuration and characteristics of the sensor input surface. For instance, the sensor input surface may be formed from glass, sapphire, plastics or other rigid materials. Some materials, such as glass, may work with many ranges of frequencies depending upon the acoustic properties of the material including the longitudinal wave speed and shear wave speed. This combination of wave speeds will provide a different in and out of plane motion over the glass surface.

Configuration 1010 includes 3 transducers arranged in around the sensor input surface. As compared to the other configurations, there are fewer transducers which reduces the number of channels. However, because the transducers are not paired, detection and identification of contaminants may be more complex than with the other configurations detected in FIG. 10. In other words, detection and identification of contaminants may be better optimized when the transducers are arranged in pairs. In this regard, the configuration 1010 may require more complicated electronics to increase the width of the frequency bands of the transducers.

Configuration 1020 includes two pairs of transducers. This configuration may provide the flexibility of 4 channels as well as improved detection and identification of contaminants between paired transducers (paired across the sensor input surface rather than by adjacent transducers). This configuration also provides more efficient cleaning as compared to configuration 1010 as it may enable more actively controlled standing waves. In addition, the concave shape of the transducers of configuration 1020, especially when paired with a second transducer, may result in wave patterns that increase the cleaning strength of a specific local area between the paired transducers.

Configuration 1030 also includes two pairs of transducers. This configuration may provide the flexibility of 4 channels as well as improved detection and identification of contaminants between paired transducers (paired across the sensor input surface rather than by adjacent transducers). This configuration also provides more efficient cleaning as compared to configuration 1010 as it may enable more actively controlled standing waves. Although both configurations may have similar functionality, the less-curved shape of the transducers of configuration 1030 may provide more coverage of the sensor input surface than the more-curved shape of the transducers of configuration 1020. In this regard, using a pair of flat transducers (i.e. not concave or convex), may result in wave patterns that may provide a more uniform cleaning strength across the area between the transducers.

Configuration 1040 also includes two pairs of transducers. This configuration may provide the flexibility of 4 channels as well as improved detection and identification of contaminants between paired transducers (paired across the sensor input surface rather than by adjacent transducers). This configuration also provides more efficient cleaning as compared to configuration 1010 as it may enable more actively controlled standing waves. However, this configuration combines lower and higher frequency transducers. The lower frequency transducers which produce longer wavelengths being represented by the thicker shapes, and the higher frequency transducers which produce shorter wavelengths being represented by the thinner shapes. In this regard, each higher frequency transducer is paired with a lower frequency transducer. This combination may allow for improved clearing functions over configurations 1010, 1020, 1030 by also improving the ability of the transducers to generate traveling waves. For instance, certain frequencies of standing waves may be more effective at cleaning certain types and sizes of contaminants. So, multiple transducers which can operate to create waves of different frequencies may provide the ability to mix multiple frequencies and wavelengths which may potentially enable the ultrasonic cleaning system 400 to clean a greater number of different types and sizes of contaminants. The actual frequencies used may be verified by real world testing and simulations. In addition because the higher frequency transducers are arranged towards the bottom of the sensor input surface, this configuration may provide for better collection of smaller droplets into larger droplets which can be readily cleared by the lower frequency waves from the lower frequency transducers. In this regard, this configuration may provide better cleaning function than configurations 1010, 1020, 1030.

Configuration 1050 also includes two pairs of transducers. This configuration may provide the flexibility of 4 channels as well as improved detection and identification of contaminants between paired transducers (paired across the sensor input surface rather than by adjacent transducers). This configuration also provides more efficient cleaning as compared to configuration 1010 as it may enable more actively controlled standing waves. However, this configuration combines lower and higher frequency transducers. The lower frequency transducers which produce longer wavelengths being represented by the thicker shapes, and the higher frequency transducers which produce shorter wavelengths being represented by the thinner shapes. In this regard, each higher frequency transducer is paired with another higher frequency transducer, and each lower frequency transducer is paired with another lower frequency transducer. This combination may allow for improved cleaning and clearing function over configurations 1010, 1020, 1030 for the reasons discussed above with regard to configuration 1040 (e.g. by improving the ability of the transducers to generate traveling waves and by enabling the generation of standing waves with two different wavelengths).

Configuration 1060 also includes two pairs of transducers. This configuration may provide the flexibility of 4 channels as well as improved detection and identification of contaminants between paired transducers (paired across the sensor input surface rather than by adjacent transducers). This configuration also provides more efficient cleaning as compared to configuration 1010 as it may enable more actively controlled standing waves. Although both configurations may have similar functionality, the convex shape of the transducers of configuration 1060 may provide more coverage of the sensor input surface than the concave shape of the transducers of configurations 1010, 1020, 1030, 1040, 1050. This may also result in poorer performance for the cleaning function as compared to configurations 1020 and 1030 as it may be more difficult to produce standing waves and result in less power.

Figure 11:
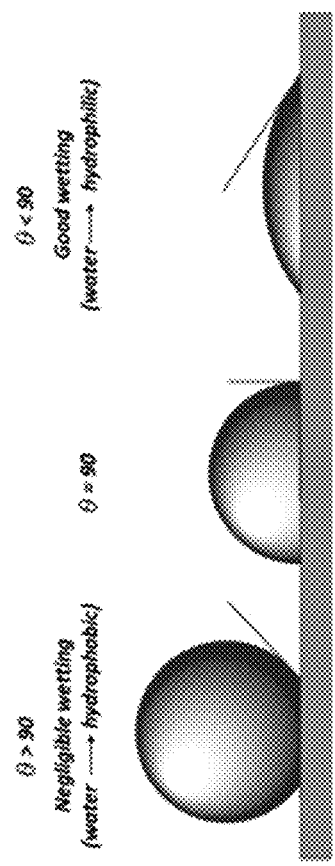
FIG. 11 are examples of contact angles in accordance with aspects of the disclosure.

In order to improve the effectiveness of the cleaning, the contact angle of droplets hitting the sensor input surface can be manipulated. For instance, as depicted in FIG. 11, a higher contact angle (e.g. greater than 90 degrees) may make it easier for droplets to run off of the sensor input surface, but may also make it more difficult to impart energy to the liquid cleaning fluid. In this regard, a lower contact angle (e.g. less than 90 degrees) may be preferable for the cleaning function, whereas a higher contact angle is preferable for the clearing function. A higher contact angle may be achieved by coatings, and specifically nano structures that are more hydrophobic coatings will keep drops from wetting (or spreading out) which may help with cleaning. At the same time, coatings that are more hydrophilic will result in a lower contact angle and cause wetting (or spreading out) which may help with clearing. However, once organic contaminants contact the sensor input surface, this may tend to reduce the contact angle and therefore aid in the cleaning function. In this regard, hydrophilic surfaces (and hydrophilic coatings on the sensor input surface) may be preferred over hydrophobic surfaces (and hydrophobic coatings on the sensor input surface) when both cleaning and clearing functions are desired.

Example Methods

Figure 12:
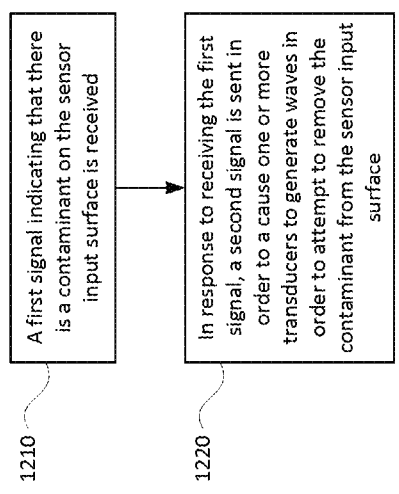
FIG. 12 is an example flow diagram in accordance with aspects of the disclosure.

FIG. 12 is an example flow diagram for cleaning a sensor having a rotating sensor housing including a sensor input surface which may be performed by one or more processors of a controller such as the processors of controllers 440, 450. At block 1210, a first signal is received by one or more processors indicating that there is a contaminant on the sensor input surface. This first signal may be received from the sensor status system 460 based on any number of different inputs. As one example, if the sensor data generated by the sensor 300 becomes degraded, this may indicate that there is a contaminant on the sensor input surface 350. In addition or alternatively, images from a camera arranged to capture images of the sensor input surface may be processed to determine that there is a contaminant on the sensor input surface 350. In addition or alternatively, feedback from the transducers 452 may be processed to determine that there is a contaminant on the sensor input surface.

Figure 13:
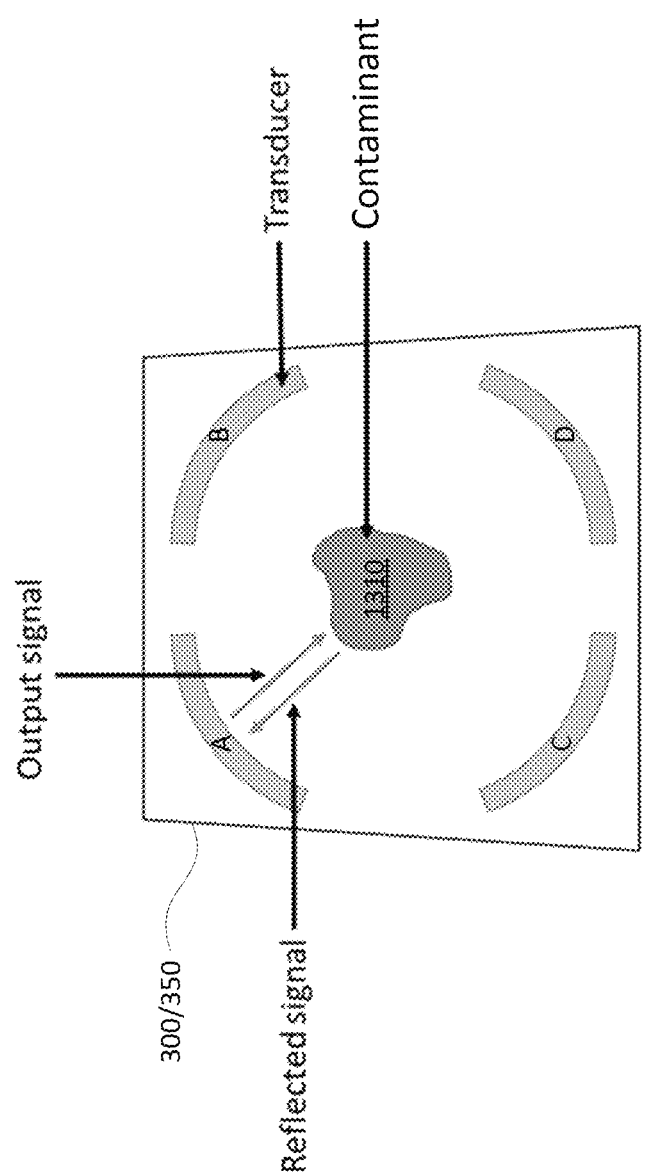
FIG. 13 is an example representation of the detection of contaminants in accordance with aspects of the disclosure.

For instance, a very small signal, on the order of 1 mW can be used to measure impedance of the surface of the sensor input surface. The multi-channel configurations of FIG. 10 may be used to detect approximately where the contaminant is located. For example, turning to FIG. 13, transducer A may send a signal which, if the sensor input surface were clear, received by its paired transducer, transducer D. The sensor input surface would cause a certain amount of impedance on the signal received at transducer D. However, the contaminants 1310 may cause some of the signal to be reflected back to the transducer A, and may impede the signal, causing none or some of the signal to reach transducer D. Thus, the impedance, including the mode frequency, value of impedance, and the ratio or resistance and reactance would change. This change in the impedance may be used to determine that there is a contaminant in the sensor input surface. A similar effect may occur with each of the transducers B, C, D where a signal sent to a paired transducer may be reflected by the contaminant 1310 back to that respective transducer and/or impeded by the contaminant. In addition, the timing of the reflected signals received at transducers A, B, C, D may be used to determine the distribution (e.g. shape and location) of the contaminant 1310.

In addition, impedance may also change with the type of the contamination. In this regard, statistical analysis and/or machine learning utilizing data generated by testing different types of contaminants may be used to categorize different types of contaminants based on expected changes in impedance values. This information may be used by the ultrasonic cleaning system 400 to estimate how much liquid cleaning fluid and power is needed to clean and clear the sensor input surface.

In this regard, based upon signals received from the transducers 452, not only may the sensor status system 460 determine that the sensor input surface includes a contaminant, but also the location of the contaminant as well as possibly the type of contaminant. The sensor status system 460 may then send the aforementioned signal indicating that the sensor input surface has a contaminant to the processors 120 of the computing devices 110.

Returning to FIG. 12, at block 1220, in response to receiving the first signal, a second signal is sent to cause a transducer to generate waves in order to attempt to remove the contaminant from the sensor input surface. In this regard, the ultrasonic cleaning system 400 may activate the ultrasonic cleaning and/or clearing functions of the transducers. For instance, the computing devices 110 may send a signal to the controller 450 in order to cause the controller to activate the transducers 452. For example, if the contaminant is determined to be water, the controller may activate the transducers in order to generate traveling waves according to the clearing function (or decrease the ratio of standing waves to traveling waves). In this regard, individual transducers may be activated at different times in order to generate more traveling waves. In this regard, the controller 450 may attempt to minimize the ratio of standing waves to traveling waves to perform the clearing function.

As another example, if the contaminant is determined to be other than water (or a combination of water and other contaminants), the controller 450 may activate the transducers to generate standing waves (or increase the ratio of standing waves to traveling waves). In this regard, pairs of transducers may be activated together in order to generate more standing waves. In this regard, the controller may attempt to maximize the ratio of standing waves to traveling waves to perform a cleaning function.

In addition, the computing devices 110 may send a signal to the controller 440 in order to cause the controller to activate liquid nozzle and air nozzle (if used). For instance, the controller 440 may use the information about the location and type of contaminant to choose appropriate cleaning cycles. As noted above, the liquid nozzle may be configured to provide a spray of liquid, and the air nozzle being configured to provide a puff of gas. For instance, the controller 440 may receive a signal from computing devices 110 indicating that the sensor input surface 350 requires cleaning. As noted above, the liquid nozzle 410 may provide a spray of liquid cleaning fluid to attempt to clean contaminants from the sensor input surface 350, and the air nozzle 420 may provide a puff of gas to remove liquid cleaning fluid and/or contaminants from the sensor input surface.

When to activate the liquid nozzle in order to provide the spray of liquid on the sensor input surface is determined based on the current position of the sensor. For example, the timing of the activation of the liquid pump 414 and the opening of the liquid valve 418 may be determined in order that the spray of liquid cleaning fluid from the liquid nozzle 410 is made as the sensor input surface 350 rotates passed the liquid nozzle in order to cause the liquid cleaning fluid to contact the sensor input surface without wasting the liquid cleaning fluid (i.e. rather than spraying on other portions of the sensor housing than the sensor input surface).

The timing of the activation of the air pump 422 and the opening of the air valve 428 may be determined in order that the puff of gas from the air nozzle 420 is made as the sensor input surface 350 rotates passed the air nozzle in order to cause the puff of gas to contact the sensor input surface (i.e. rather than puffing on other portions of the sensor housing than the sensor input surface).

The liquid nozzle may then be activated based on the determination of when to activate the liquid nozzle. In addition, the air nozzle may be based on the determination of when to activate the air nozzle. For example, the liquid valve 418, air valve 428, liquid pump 414, and air pump 422 may be activated in order to cause a spray of liquid cleaning fluid to contact the sensor input surface 350 as the sensor input surface rotates passed the liquid nozzle 410 and to cause a puff of gas to contact the sensor input surface as the sensor input surface rotates passed the air nozzle 420.

In addition, once the liquid nozzle 410 has generated the spray of liquid cleaning fluid, the controller 450 may activate the transducers in order to generate traveling waves according to the clearing function (or decrease the ratio of standing waves to traveling waves). In this regard, individual transducers may be activated at different times in order to generate more traveling waves or otherwise in order to minimize the ratio of standing waves to traveling waves to perform the clearing function. This, in conjunction with the rotation of the sensor housing as well as the puff of gas generated by the air nozzle (if used), may cause the liquid cleaning solution, contaminants and other fluids to be removed from the sensor input surface 350. As a result, the sensor input surface 350 may return to optimal (clean) or near optimal performance.

This cleaning and clearing may be repeated as needed to reduce or keep the sensor input surface clear of contaminants. However, in some instances, if the sensor input surface is not clean for a predetermined amount of time, this may be used to change the behavior of other systems of the vehicle. For instance, the perception system 172 may degrade the fidelity of the data feed from that specific sensor (e.g. reduce a confidence value, etc.).

Alternatively, if the functions of controllers 440 and 450 are implemented in a single controller, a single signal from the computing devices 110 may cause that controller to both activate the transducers 420 as well as the liquid nozzle 410 and air nozzle 420 (if used) as in the examples described above.

As noted above, if the contaminant is identified as water, only the ultrasonic clearing function of the transducers may need to be utilized to clear the sensor input surface. In other words, the ultrasonic cleaning system 400 may minimize the ratio of standing waves to traveling waves to perform the clearing function when the contaminant is water. In such instances, a spray of liquid cleaning fluid from the liquid nozzle 410 may not be needed or used. As such, the liquid cleaning fluid can be preserved for use with contaminants other than water and therefore last longer. However, if used, the puff of air may still be used in order to increase the clearing function capabilities of the ultrasonic cleaning system 400.

The features described herein may provide for a useful and practical approach to cleaning rotating sensors. The combination of cleaning and clearing functionality of the ultrasonic cleaning features described herein may provide significant improvements over other systems without such features. Moreover, the use of ultrasonic cleaning may also reduce the amount of liquid cleaning solution needed to remove contaminants from a sensor input surface. In addition, the use of the impedance information to detect contaminants may obviate the need for additional devices, (e.g., a camera) to serve the same purpose and thereby save power and other resources on the vehicle. Other benefits may include potentially, better reliability of the ultrasonic cleaning system (due to fewer mechanical parts), lower cost (once having more integrated design and mass produced), smaller (as the transducers can be miniature), as well as a simplified construction with fewer maintenance requirements than other cleaning and clearing approaches with more hardware and more potential points of failure.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for cleaning a rotating sensor, the sensor including a sensor housing with a sensor input surface, the method comprising:
 receiving, by one or more processors of a controller, a first signal indicating that there is a contaminant on the sensor input surface; and in response to receiving the first signal, sending, by the one or more processors of a controller, a second signal to one or more transducers in order to cause the one or more transducers to generate waves in order to attempt to remove the contaminant from the sensor input surface, wherein the first signal further indicates a type of the contaminant and wherein the one or more processors responsively control a ratio of standing waves to traveling waves generated by the one or more transducers based, on the indicated type of contaminant.

2. The method of claim 1, wherein the first signal received by the one or more processors of a controller further indicates a location of the contaminant on the sensor input surface.

3. The method of claim 1, further comprising, in response to the one or more transducers receiving the second signal, sending a third signal from the one or more processors of a controller to cause a liquid nozzle to provide a spray of liquid cleaning fluid on the sensor input surface.

4. The method of claim 3, wherein sending the third signal from the one or more processors of a controller further causes an air nozzle to provide a puff of gas on the sensor input surface.

5. The method of claim 1, wherein the reception of the second signal by the one or more transducers further causes a liquid nozzle to provide a spray of liquid cleaning fluid on the sensor input surface.

6. The method of claim 5, further comprising sending a third signal to the one or more transducers to cause an air nozzle to provide a puff of gas on the sensor input surface.

7. The method of claim 1, further comprising initially, maximizing the ratio of standing waves to traveling waves to perform a cleaning function and thereafter minimizing the ratio of standing waves to traveling waves to perform a clearing function.

8. The method of claim 1, wherein when the type of contaminant is water, the method further comprises, minimizing the ratio of standing waves to traveling waves to perform a clearing function.

9. The method of claim 1, wherein when the type of contaminant is other than water, the method further comprises, maximizing the ratio of standing waves to traveling waves to perform a cleaning function.

10. The method of claim 1, wherein the first signal includes impedance information from the one or more transducers.

11. A system for cleaning a sensor, the sensor including a rotating sensor housing with a rotating sensor input surface, the system comprising:
one or more transducers; and
one or more processors of a controller configured to:
receive, by the one or more processors of a controller, a first signal indicating that there is a contaminant on the sensor input surface; and
in response to receiving the first signal, sending from one or more processors of a controller a second signal to the one or more transducers to cause the one or more transducers to generate waves in order to attempt to remove the contaminant from the sensor input surface, wherein the first signal further indicates a pe of the contaminant and wherein the one or more processors responsively control a ratio of standing waves to traveling waves generated by the one or more transducers based, on the indicated type of contaminant.

12. The system of claim 11, wherein the first signal received by the one or more processors of a controller further indicates a location of the contaminant on the sensor input surface.

13. The system of claim 11, wherein the one or more transducers include exactly three transducers.

14. The system of claim 11, wherein the one or more transducers include at least one pair of transducers.

15. The system of claim 14, wherein the at least one pair of transducers includes at least one higher frequency transducer and at least one lower frequency transducer.

16. The system of claim 11, wherein the one or more transducers include a convexshape.

17. The system of claim 11, wherein the one or more transducers include a concave shape.

* * * * *